US008897958B2

(12) United States Patent  
Dehart et al.

(10) Patent No.: US 8,897,958 B2  
(45) Date of Patent: Nov. 25, 2014

(54) METHOD FOR DETERMINING AMBIENT AIR TEMPERATURE OUTSIDE OF A VEHICLE

(75) Inventors: Ronald C. Dehart, Kernersville, NC (US); Jason Stone, Greensboro, NC (US); Mark Mittelstaedt, Kernersville, NC (US)

(73) Assignee: Volvo Group North America, LLC, Greensboro, NC (US)

( * ) Notice: Subject to any disclaimer, the term of this patent is extended or adjusted under 35 U.S.C. 154(b) by 111 days.

(21) Appl. No.: 13/522,065

(22) PCT Filed: Feb. 4, 2011

(86) PCT No.: PCT/US2011/023664  
§ 371 (c)(1),  
(2), (4) Date: Jul. 13, 2012

(87) PCT Pub. No.: WO2011/097426  
PCT Pub. Date: Aug. 11, 2011

(65) Prior Publication Data  
US 2012/0323440 A1 Dec. 20, 2012

Related U.S. Application Data

(60) Provisional application No. 61/301,749, filed on Feb. 5, 2010.

(51) Int. Cl.  
G06F 7/00 (2006.01)  
G01K 1/16 (2006.01)

(52) U.S. Cl.  
CPC .............. G01K 1/16 (2013.01); G01K 2201/02 (2013.01)  
USPC ........................... 701/36; 123/41.12; 374/141

(58) Field of Classification Search  
USPC ......... 701/38, 36, 1, 101, 111, 14, 51, 55, 22, 701/54, 7, 68, 19; 62/186, 176.6; 165/42; 702/130; 374/141, 179, 702; 455/522, 455/7, 466, 69, 414  
See application file for complete search history.

(56) References Cited

U.S. PATENT DOCUMENTS 4,682,536 A * 7/1987 Nolting ........................... 454/75  
4,770,543 A * 9/1988 Burghoff et al. ............... 374/142  
(Continued)

FOREIGN PATENT DOCUMENTS

SG 141220 A1 4/2008

OTHER PUBLICATIONS

International Search Report for corresponding International Application PCT/US2011/023664.

(Continued)

*Primary Examiner* — Thomas G Black  
*Assistant Examiner* — Robert Payne  
(74) *Attorney, Agent, or Firm* — Marin Farrell; Michael Pruden

(57) ABSTRACT

A method for determining ambient air temperature outside of a vehicle with a sensor mounted on the vehicle, includes the steps of determining a road speed of the vehicle, comparing the determined road speed to a reference road speed value, if the determined road speed is below the reference road speed value, activating a device to move ambient air across the sensor, the ambient air being drawn from a location outside the vehicle, taking a temperature reading with the sensor, and, if the temperature reading is lower than a stored temperature value, storing the lower temperature reading as the ambient air temperature.

20 Claims, 4 Drawing Sheets

(56) References Cited

U.S. PATENT DOCUMENTS

| | | |
|---|---|---|
| 5,416,728 A | 5/1995 | Rudzewicz et al. |
| 5,813,765 A * | 9/1998 | Peel et al. ............... 374/141 |
| 6,443,105 B2 * | 9/2002 | Oishi .................... 123/41.12 |
| 7,387,437 B2 * | 6/2008 | Brown et al. ............ 374/141 |
| 7,599,812 B2 * | 10/2009 | Kyrtsos et al. ........... 702/130 |
| 7,650,927 B2 * | 1/2010 | Burns ...................... 165/42 |
| 7,845,182 B2 * | 12/2010 | Yelles ................... 62/176.6 |
| 2008/0178620 A1 | 7/2008 | Yelles |
| 2009/0151660 A1 | 6/2009 | Zamora et al. |
| 2009/0286459 A1 * | 11/2009 | Major et al. ............... 454/75 |

OTHER PUBLICATIONS

Examination Report No. 1 for corresponding Australia application No. 2011212837 dated Oct. 24, 2013.

* cited by examiner

METHOD FOR DETERMINING AMBIENT AIR TEMPERATURE OUTSIDE OF A VEHICLE

This application claims the benefit of U.S. Provisional Patent Application No. 61/301,749, filed Feb. 5, 2010.

BACKGROUND AND SUMMARY

Conventional systems in a vehicle for measuring ambient air temperature include a sensor placed on the vehicle in a location exposed to ambient air. Any location on the vehicle, however, is subject to heat generated by the vehicle engine, exhaust, transmission, etc., which could influence a temperature measurement. When the vehicle is stationary or moving slowly, for example, a boundary layer of hot air exists around the engine compartment and exhaust components, and ambient air temperature measurement is influenced by the heat in this boundary layer.

Various methods for reducing or correcting for the effect of vehicle-generated heat are known. U.S. Pat. No. 5,813,765 to Peel et al. includes placing the temperature sensor on the radio antenna to locate it as far as possible from vehicle heat sources. U.S. Pat. No. 7,387,437 to Brown et al. discloses using multiple sensors placed at different locations on the vehicle, comparing the readings from the multiple sensors, and applying a correction factor generated according to vehicle speed and other factors. U.S. Pat. No. 4,770,543 to Burghoff et al. discloses a method including monitoring vehicle speed and using a temperature measured when speed exceeds a threshold, and, when speed drops below the threshold, storing and using a last temperature measurement before the speed dropped below the threshold.

The invention improves on the art in proposing a method and system for measuring ambient air outside a vehicle that overcomes deficiencies in the art. According to the invention, a temperature sensor is mounted in a flow path of an air blowing or moving device, such as the engine radiator fan. A controller is configured to monitor at least one vehicle parameter, compare the vehicle parameter to a reference parameter, and responsive to the comparison, control the air blowing device and make an ambient air temperature reading.

According to the invention, the vehicle parameter may be a vehicle speed value, and the air blowing device is controlled to be activated to move ambient air across the sensor if the vehicle speed value is below a road speed reference value stored in a controller memory.

According to another aspect of the invention, the method includes the steps of monitoring the vehicle speed for a measured interval after taking the temperature reading, and, if the determined road speed remains below the road speed reference value during the interval, further including activating the device to move ambient air across the sensor, taking a temperature reading with the sensor, and holding the temperature reading as the current ambient air temperature if the temperature reading is lower than the stored temperature value.

According to another aspect of the invention, the sensor is mounted in an air flow path of a vehicle radiator fan, and the step of controlling the device to move ambient air across the sensor comprises activating the radiator fan.

Alternatively, an air blowing device to move air across the sensor may be provided if locating the sensor in the radiator fan flow path is not convenient or desired.

According to another aspect of the invention, the method includes applying a correction to the temperature reading and storing the corrected temperature reading as the ambient air temperature. The correction may compensate for the effect of heat not removed by the activated fan, and may constitute a subtraction of 2 degrees Celsius.

The method also includes the step of communicating the current ambient air temperature to vehicle components, for example, by broadcasting a temperature signal on the CAN bus. The Engine Management System and other controllers can then make use of the temperature information to perform various functions.

According to the invention, the method includes taking a plurality of temperature readings during a predetermined time duration while the fan is activated and storing a lowest temperature reading as the current ambient air temperature.

According to another aspect of the invention, if the determined road speed is above the road speed reference value, for example 50 kph, for at least a predetermined time duration, the method includes continuously taking temperature readings as the ambient air temperature. The predetermined time duration may be set at 90 seconds to allow sufficient air flow over the temperature sensor to remove enough engine heat for an accurate ambient air temperature reading.

According to yet another aspect of the invention, if the determined road speed is above a second road speed reference value, for example 80 kph, which is higher than the first road speed reference value, the method includes immediately continuously taking temperature readings and storing a lowest value as the ambient air temperature.

According to another aspect of the invention, the method includes monitoring the engine temperature, and upon determining that the engine temperature is below a reference temperature, for example, 50 degrees Celsius, which indicates a cold engine start, taking a temperature reading with the sensor, and, holding the temperature reading as the current ambient air temperature.

According to yet another aspect of the invention, the method includes monitoring the engine temperature and if the engine temperature is above the reference temperature, for example, 50 degrees Celsius, which indicates a warm engine or may indicate a warm engine start, holding the last held temperature reading as the current ambient air temperature for a measured interval, activating the device to move ambient air across the sensor after the measured interval, taking a temperature reading with the sensor and, holding the temperature reading as the current ambient air temperature if the temperature reading is lower than the held temperature value. The measured interval for holding the last held temperature may be 60 minutes, for example.

BRIEF DESCRIPTION OF THE DRAWING FIGURES

DETAILED DESCRIPTION

Figure 1:
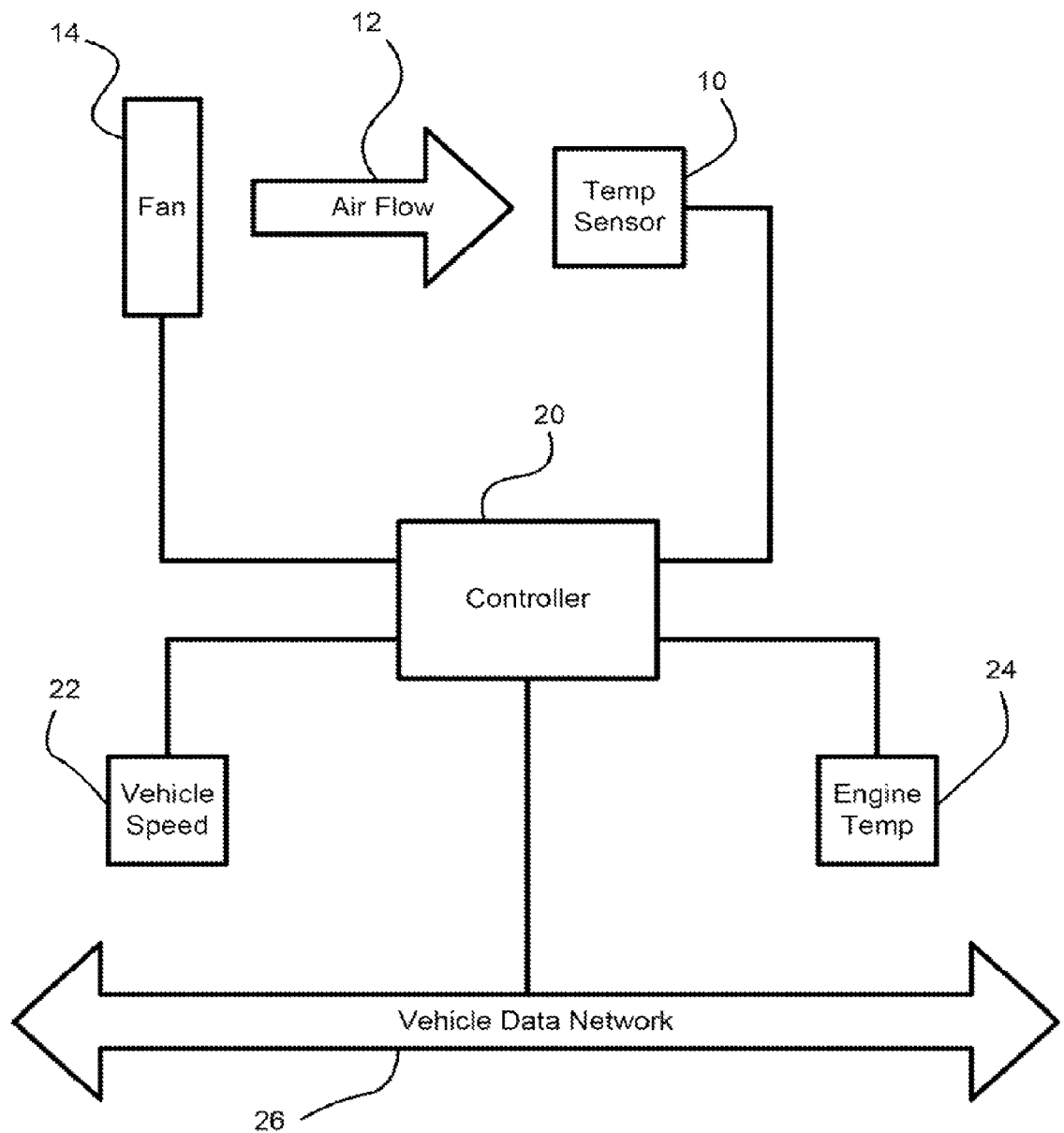
FIG. 1 is a schematic representation of an embodiment of a system according to the invention.

An exemplary embodiment of a system for determining ambient temperature according to the invention is illustrated schematically in FIG. 1. The system includes a temperature sensor 10 mounted on the vehicle (not illustrated) in an air flow path 12 of an air blowing device or fan 14. The fan 14 may conveniently be the vehicle radiator fan. Alternatively, a dedicated fan may be provided if mounting the temperature sensor near the radiator is not desired. The fan 14 or air blowing device is arranged to draw air from outside the vehicle, i.e., ambient air, and move it across the temperature sensor.

A controller 20 is connected to receive temperature readings from the temperature sensor 10. The sensor 10 may be connected to an instrument cluster module (See, FIG. 2) which receives the temperature reading and passes it to a Vehicle Electronic Control Unit (ECU). The controller 20 is also connected to the fan 14 to control operation of the fan, and is connected to receive signals from a vehicle speed sensor 22 and engine temperature sensor 24. The controller may be implemented as a single device, which in this described embodiment is the Vehicle ECU.

The controller 20 broadcasts the ambient air temperature value onto the vehicle data network 26, for example, a J1939 CAN link to communicate the value to other systems on the vehicle that make use of the temperature value. This may include, for example, the instrument cluster, which displays the temperature value to the driver, and the Engine Management System. The Engine Management System may use the ambient air temperature in performing certain functions, for example, in exhaust aftertreatment systems temperature models, in mass flow calculations and condensation protection, and controlling exhaust gas recirculation cooler cleaning, among others.

Figure 2:
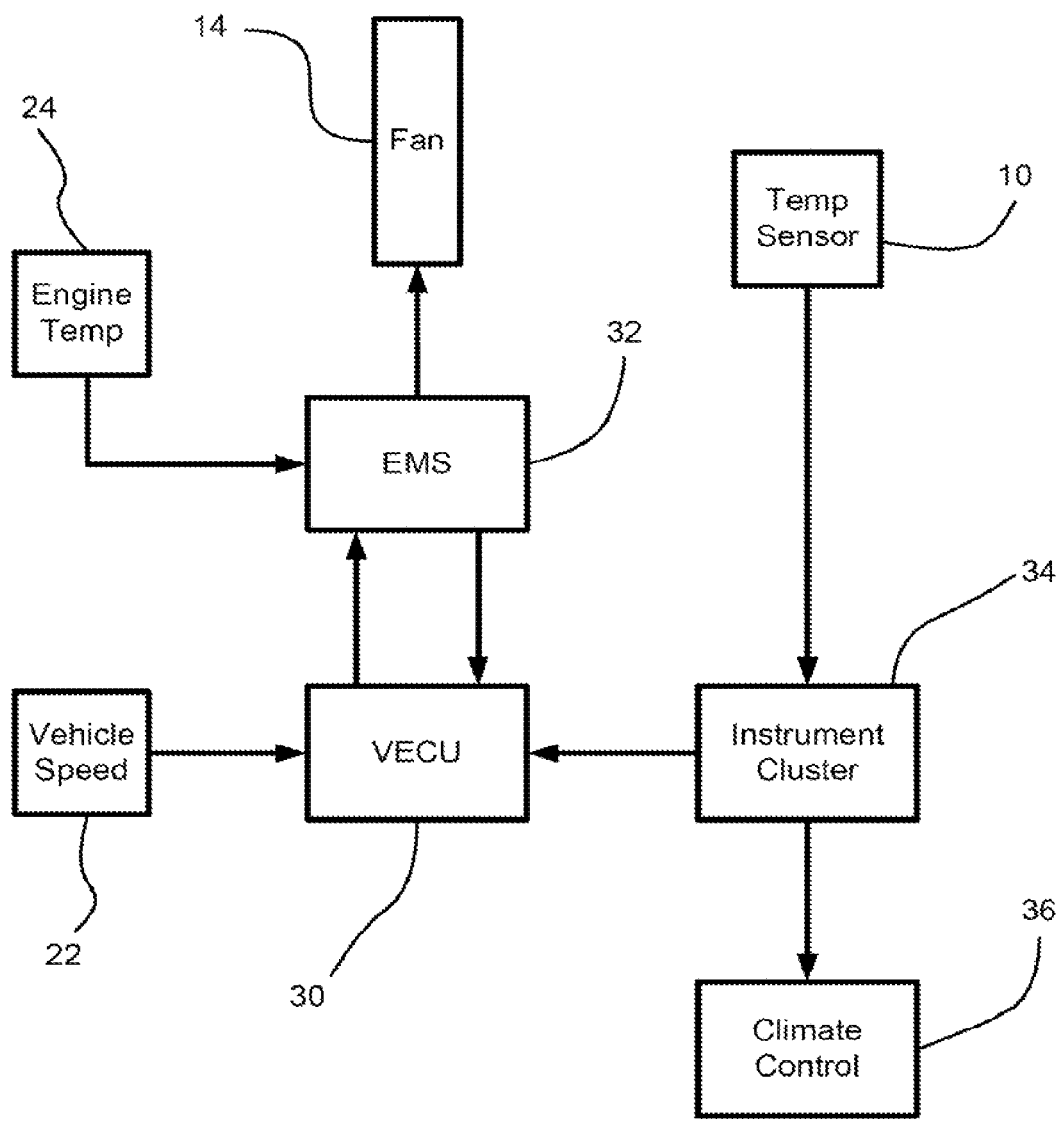
FIG. 2 is a schematic representation of a controller arrangement in accordance with the invention.

Alternatively, the controller 20 may comprise several devices interconnected for communication by the vehicle data bus, each performing one or more of the control functions, as illustrated in FIG. 2. For example, the controller 20 may be implemented as and comprise an Engine Management unit 32 controlling the fan and reading engine temperature, an Instrument Cluster unit 34 reading ambient temperature, and a Vehicle ECU 30 reading vehicle speed and performing other logic. In this arrangement, the Instrument Cluster 34 provides the temperature sensor reading to the VECU 30 and to a Climate Control unit 36. The VECU 30 logic, as explained below, includes correcting the temperature sensor reading to produce an ambient temperature signal for the EMS 32. Other configurations are also possible.

The controller 20 contains control logic and processes the ambient air temperature signal. According to the invention, the temperature sensor value may be processed by applying a correction factor. According to the invention, the correction factor may be a subtraction of 2 degrees C. to compensate for the effects of heat that cannot be removed by the activation of the fan.

Figure 3:
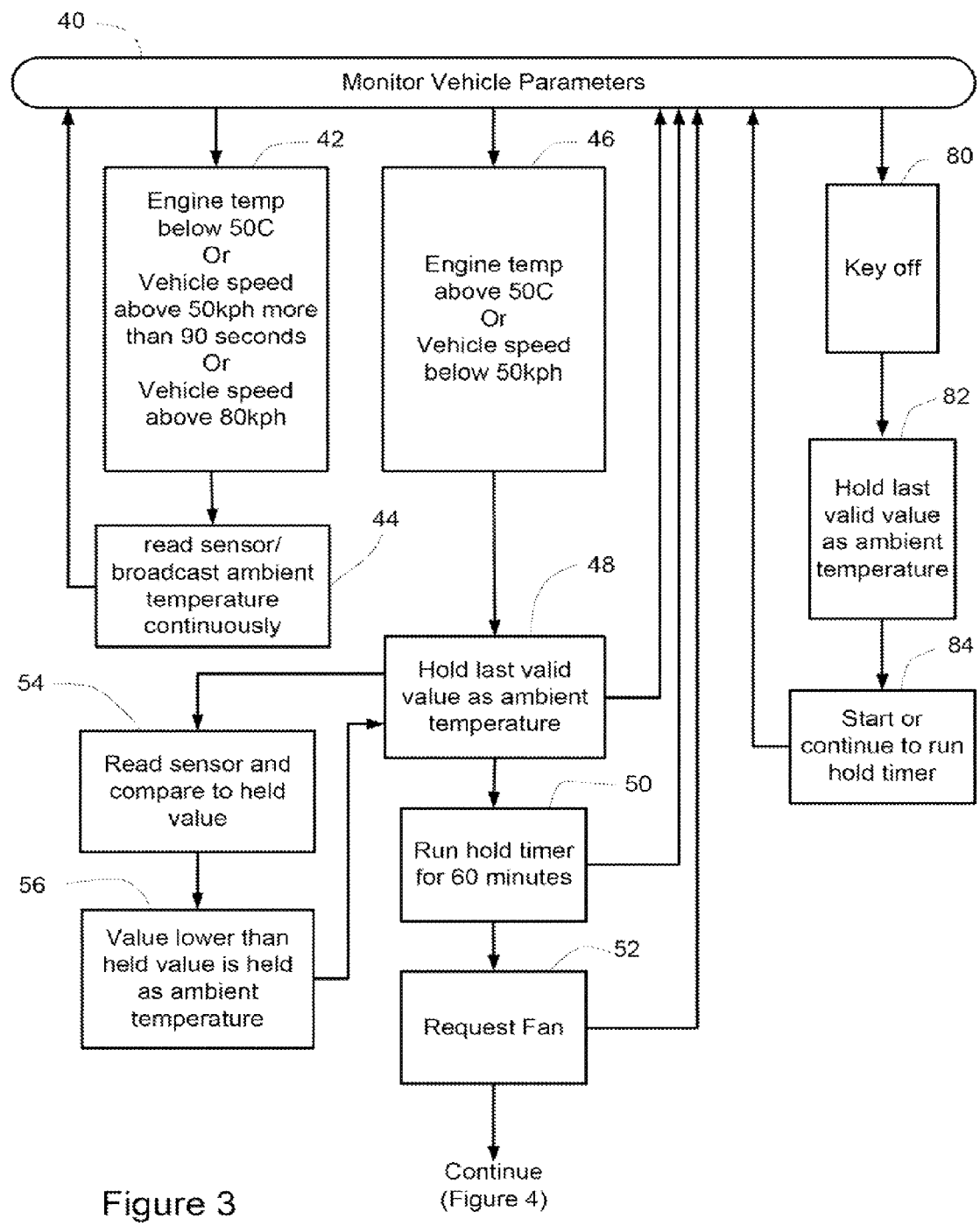
FIG. 3 is a functional diagram of a portion of an embodiment of a method according to the invention.
Figure 4:
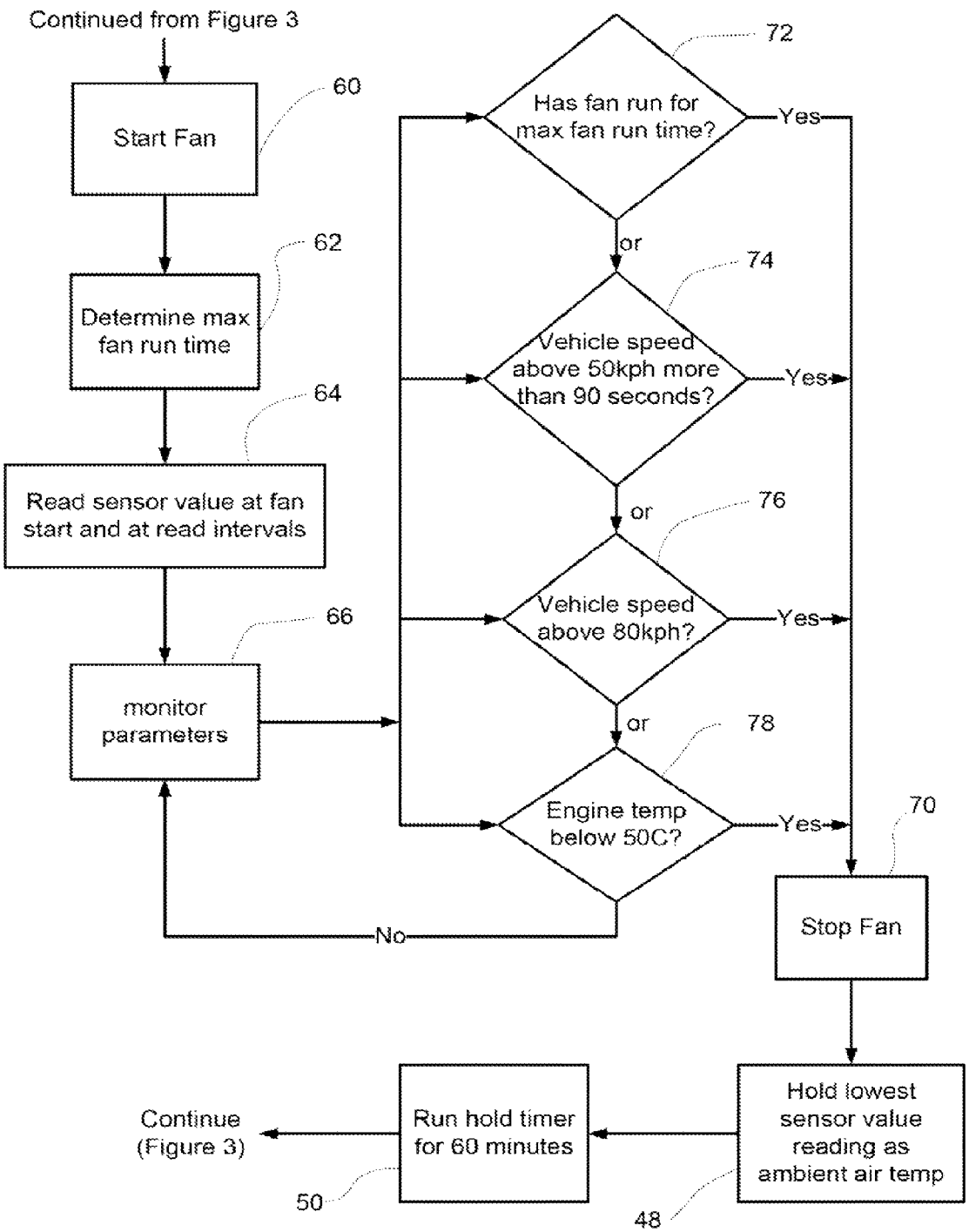
FIG. 4 is a diagram of another portion of the method of FIG. 3.

An exemplary embodiment of a method according to the invention is shown in the functional diagrams of FIGS. 3 and 4. The method as shown should not be understood as requiring certain steps to be performed in a particular sequence; rather, the figures show relationships between and among functions, and, as described below, it should be understood that certain functions may be performed continuously or performed simultaneously in parallel, and depending on the result of a function, subsequent functions may then be performed.

The controller 20 determines the ambient air temperature according to the method described below, and holds and communicates the ambient air temperature to other vehicle components, which may be as described above. The terms "held" or "hold" here means storing the value in memory and using that stored value when communicating the ambient air temperature. According to the invention, when the engine is shut off, the controller will hold the currently held temperature value until a new value is held.

Referring now to FIG. 3, the controller 20 will access various vehicle systems or sensors to monitor vehicle parameters 40, including engine temperature (e.g., engine oil or coolant temperature), vehicle speed, and key position. Monitoring vehicle parameters continues as other functions are performed, as certain values for vehicle parameters will determine that functions are performed, overriding other functions, as will be understood. The value for engine temperature is compared to a reference temperature. The value for vehicle speed is compared to a reference first speed and a reference second speed, which is higher than the first speed.

If the controller 20 determines that the engine temperature is below an engine temperature reference value 42, for example a coolant temperature of 50 degrees Celsius, which may indicate a cold engine start, the ambient temperature sensor 10 is read continuously and the value broadcast continuously 44. The controller 20 continues to monitor vehicle parameters.

Similarly, if the controller 20 determines that the vehicle speed has been above the first reference vehicle speed for more than a predetermined time interval 42, the ambient temperature sensor 10 is read continuously and the value broadcast continuously. The first reference vehicle speed is high enough that an air flow over the sensor is sufficient to give an accurate temperature reading, which hi this embodiment is 50 kph. The predetermined time interval is sufficiently long to provide an ambient air flow to remove from the sensor and its environs heat that may be present if the vehicle had been stopped or moving slowly. In this embodiment, the predetermined time interval is 90 seconds. The controller continues to monitor the vehicle parameters 40.

Also, if the controller 20 determines that the vehicle speed is above the second reference vehicle speed, which in this embodiment is 80 kph, the ambient temperature sensor 10 is read continuously and the value broadcast continuously 44. This second, higher speed reference is sufficiently high, and will involve a sufficiently long acceleration time, that the temperature sensor 10 reading is considered accurate. The controller 20 continues to monitor vehicle parameters.

If the controller determines that the vehicle speed is below the first reference speed or the engine temperature is above the engine reference temperature value, the last valid temperature sensor reading is held 48. A 60 minute delay timer is started 50. Note that the vehicle parameters continue to be monitored. After 60 minutes, if the vehicle parameters have not changed (i.e., the speed remains below the reference vehicle speed and/or the engine temperature remains above the reference engine temperature), the fan is requested 52.

Turning to FIG. 4, the fan request results in the fan being activated 60. A maximum fan run time is calculated 62 based on vehicle parameters related to heat generation and vehicle speed when power take-off equipment is in use. For example, the maximum fan run time may be calculated as follows: if the vehicle is moving at less than a PTO speed (in a speed range within which power take off equipment may operate, in this embodiment 8 kph) and the engine torque is greater than a PTO torque (here, 50% of maximum engine torque) and the coolant temperature is above a PTO coolant temperature (here, 80 degrees C.), the maximum fan run time is set at 5 minutes. Otherwise, the maximum fan run time is set at 150 seconds. The fan run times are calculated to provide a sufficient flow of air to the sensor to remove enough engine heat to allow an accurate ambient air temperature reading.

Once the fan starts, the controller reads the temperature sensor immediately and repeats reading at read intervals 64. The read interval may be set at a duration appropriate to detect changes in the temperature sensor reading induced by the active fan, for example 60 seconds.

The controller monitors vehicle parameters for conditions related to determining a valid temperature reading 66. The controller monitors the fan run time to determine if the maximum fan run time has been reached 72 or that the vehicle speed has been above the first vehicle reference speed for more than 90 seconds 74 or that the vehicle speed is above the second vehicle reference speed 76 or that the engine temperature is below the reference engine temperature 78. If any of those parameters is met, the fan is stopped 70. An override may be provided to protect the fan clutch by keeping the fan on for a minimum fan run period, for example, 30 seconds.

If none of the parameters of fan run time 72, vehicle speed 74, 76, or engine temperature 78 is met, the controller continues to read the temperature sensor at the read intervals, and continues to monitor the fan run time, vehicle speed, and engine temperature. Again, if any of the vehicle parameters is met, as described above, the fan is stopped 70.

Alternatively, the controller may monitor for minimum fan run time, and at the end of the minimum run time, the controller will compares read temperature values to determine if the values are changing or stable. If the values are not changing or are changing within a minimum range, that is the readings differ by no more than a minimal amount, for example 1 degree C., the controller may determine that a valid temperature reading has been taken and stop the fan. If the temperature readings are not within the minimum range, the controller would continue to monitor the parameters or fan run time, vehicle speed, and engine temperature as described above.

Once the fan is stopped, the lowest read temperature sensor value is held and broadcast as the ambient temperature 48 and the hold timer is again run for 60 minutes 50, returning to the function as described in connection with FIG. 3. Also, as described above, the controller continues to monitor vehicle parameters of vehicle speed and engine temperature, which can trigger an interruption of the timer.

Referring to FIG. 3 and to step 48, when the controller holds the last valid ambient temperature value, it continues to monitor the temperature sensor and compare the readings to the held value 54. If a read value is lower than the held value, the lower value is held as the ambient air temperature 56.

If the controller determines that the key position is "off", indicating that the vehicle has been shut down 80, the last valid temperatures sensor reading is held as the ambient air temperature 82 and the hold timer continues to run. If the vehicle is started within the hold timer run time, the controller will determine ambient temperature according to the function described in connection to the hold timer (refer to step 50) or until the system detects a change in vehicle parameters calling for a new temperature sensor reading.

The invention has been described in terms of preferred principles, embodiments, components, and steps, but those of skill in the art will recognize that substitutions may be made without departing from the scope of the invention as defined in the following claims.

What is claimed is:

1. A system for determining ambient air temperature outside of a vehicle, comprising:
    a temperature sensor mounted on the vehicle to measure ambient air temperature;
    a fan mounted on the vehicle and positioned to blow ambient air across the temperature sensor; and,
    a controller configured to receive temperature sensor values, vehicle road speed values, and engine temperature values, the controller also connected to control fan operation, wherein the controller is configured to:
    compare a received road speed value to a reference road speed value, and, if the received road speed value is below the reference road speed value, activate the fan to move ambient air across the sensor, the ambient air being drawn from a location outside the vehicle;
    take a temperature reading with the sensor after the fan has been activated; and,
    if the temperature reading is lower than a stored temperature value, holding the lower temperature reading as the ambient air temperature.

2. A system for determining ambient air temperature outside of a vehicle, comprising:
    a temperature sensor mounted on the vehicle to measure ambient air temperature;
    a fan mounted on the vehicle and positioned to blow ambient air across the temperature sensor; and,
    a controller configured to receive temperature sensor values, vehicle road speed values, and engine temperature values, the controller also connected to control fan operation, wherein the controller is configured to:
    compare a received engine temperature value to a reference engine temperature value, and if the received engine temperature value is above the reference engine temperature value, activate the fan to move ambient air across the sensor, the ambient air being drawn from a location outside the vehicle;
    take a temperature reading with the sensor after the fan has been activated; and,
    if the temperature reading is lower than a stored temperature value, holding the lower temperature reading as the ambient air temperature.

3. A method for determining ambient air temperature outside of a vehicle, the vehicle having a temperature sensor mounted on the vehicle to measure ambient air temperature, a fan mounted on the vehicle and positioned to blow ambient air across the temperature sensor, and a controller configured to store a reference road speed value and a reference engine temperature value and configured to receive temperature sensor values, vehicle road speed values, and engine temperature values, the controller also connected to control fan operation, the method comprising the steps of:
    comparing a received road speed value to a reference road speed value, and, if the received road speed value is below the reference road speed value, activating the fan to move ambient air across the sensor, the ambient air being drawn from a location outside the vehicle;
    taking a temperature reading with the sensor after the fan has been activated; and,
    if the temperature reading is lower than a stored temperature value, holding the lower temperature reading as the ambient air temperature.

4. The method as claimed in claim 3, wherein if the determined road speed is above the reference road speed value for at least a predetermined time duration, comprising not activating the fan and continuously taking temperature readings as the ambient air temperature.

5. The method as claimed in claim 4, wherein if the determined road speed is above a second reference road speed value higher than the reference road speed value, comprising not activating the fan, and immediately and continuously taking temperature readings as the ambient air temperature.

6. The method as claimed in claim 3, the method further comprising taking a plurality of temperature readings during a predetermined time duration while the fan is activated and determining a lowest temperature reading as the ambient air temperature.

7. The method as claimed in claim 3, wherein the reference engine temperature value is 50 degrees Celsius, the method comprising the steps of:
   determining that an engine temperature is below 50 degrees Celsius, and not activating the fan;
   taking a temperature reading with the sensor; and,
   determining the temperature reading as the ambient air temperature.

8. The method as claimed in claim 3, wherein the sensor is mounted in an air flow path of a radiator fan, and the step of activating the fan to move ambient air across the temperature sensor comprises activating the radiator fan.

9. The method as claimed in claim 3, wherein the reference engine temperature value is 50 degrees Celsius, the method comprising the steps of:
   determining that an engine temperature is above 50 degrees Celsius;
   holding the last held temperature reading as the ambient air temperature for a measured interval;
   activating the fan after the measured interval;
   taking a temperature reading with the temperature sensor; and,
   determining the temperature reading as the ambient air temperature if the temperature reading is lower than the held temperature value.

10. The method as claimed in claim 3, comprising applying a correction to the lower temperature reading and storing the corrected temperature reading as the ambient air temperature.

11. The method as claimed in claim 3, comprising communicating the ambient air temperature to vehicle components.

12. A method for determining ambient air temperature outside of a vehicle, the vehicle having a temperature sensor mounted on the vehicle to measure ambient air temperature, a fan mounted on the vehicle and positioned to blow ambient air across the temperature sensor, and a controller configured to store a reference road speed value and a reference engine temperature value and configured to receive temperature sensor values, vehicle road speed values, and engine temperature values, the controller also connected to control fan operation, the method comprising the steps of:
   comparing a received engine temperature value to a reference engine temperature value, and if the received engine temperature value is above the reference engine temperature value, activating the fan to move ambient air across the temperature sensor, the ambient air being drawn from a location outside the vehicle;
   taking a temperature reading with the temperature sensor after the fan has been activated; and,
   if the temperature reading is lower than a stored temperature value, holding the lower temperature reading as the ambient air temperature.

13. The method as claimed in claim 12, wherein the sensor is mounted in an air flow path of a radiator fan, and the step of activating the fan to move ambient air across the sensor comprises activating the radiator fan.

14. The method as claimed in claim 12, comprising applying a correction to the lower temperature reading and storing the corrected temperature reading as the ambient air temperature.

15. The method as claimed in claim 12, comprising communicating the ambient air temperature to vehicle components.

16. The method as claimed in claim 12, the method further comprising taking a plurality of temperature readings during a predetermined time duration while the fan is activated and determining a lowest temperature reading as the ambient air temperature.

17. The method as claimed in claim 12, wherein the reference engine temperature value is 50 degrees Celsius, the method comprising the steps of:
   determining that an engine temperature is below 50 degrees Celsius, and not activating the fan;
   taking a temperature reading with the temperature sensor; and,
   determining the temperature reading as the ambient air temperature.

18. The method as claimed in claim 12, wherein the reference engine temperature is 50 degrees Celsius, the method comprising the steps of:
   determining that an engine temperature is above 50 degrees Celsius;
   holding the last held temperature reading as the ambient air temperature for a measured interval;
   wherein the step of activating fan comprises activating the fan after the measured interval;
   taking a temperature reading with the temperature sensor; and,
   determining the temperature reading as the ambient air temperature if the temperature reading is lower than the held temperature value.

19. The method as claimed in claim 12, comprising determining the road speed of the vehicle, and if the determined road speed is above the stored reference road speed value for at least a predetermined time duration, comprising not activating the fan and continuously taking temperature readings as the ambient air temperature.

20. The method as claimed in claim 19, wherein if the determined road speed is above a second reference road speed value higher than the reference road speed value, comprising not activating the fan, and immediately and continuously taking temperature readings as the ambient air temperature.

\* \* \* \* \*